(No Model.)

R. MARSH.
VALVE AND FAUCET.

No. 495,636. Patented Apr. 18, 1893.

Witnesses

Inventor
Riverius Marsh
By L. Deane,
his Attorney

UNITED STATES PATENT OFFICE.

RIVERIUS MARSH, OF NEW BRUNSWICK, NEW JERSEY.

VALVE AND FAUCET.

SPECIFICATION forming part of Letters Patent No. 495,636, dated April 18, 1893.

Application filed June 6, 1891. Serial No. 395,308. (No model.)

*To all whom it may concern:*

Be it known that I, RIVERIUS MARSH, a citizen of the United States, residing at New Brunswick, in the county of Middlesex and State of New Jersey, have invented certain new and useful Improvements in Valves and Faucets; and I do hereby declare the following to be a full, clear, and exact description of the invention, such as will enable others skilled in the art to which it appertains to make and use the same.

Figure 1:
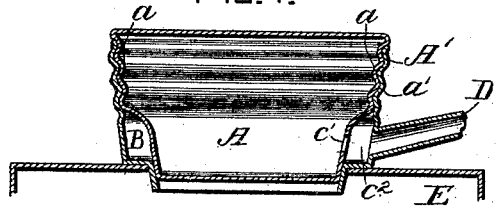
Figure 2:
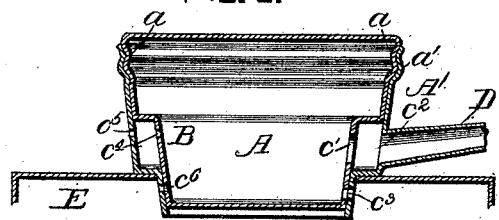
Figure 3:
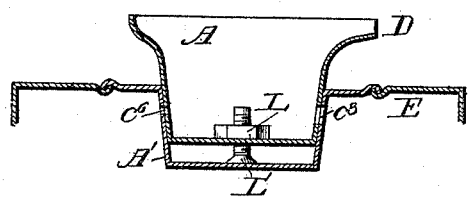
Figure 4:
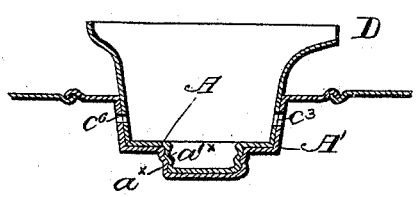
Figure 5:
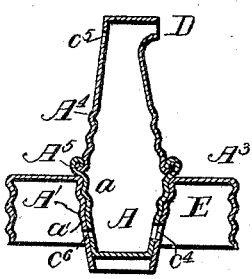
Figure 6:
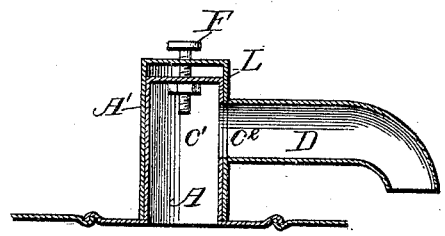
Figure 7:
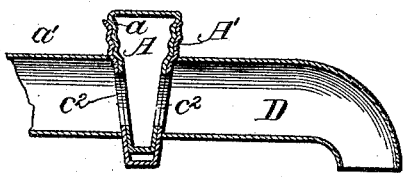
Figure 8:
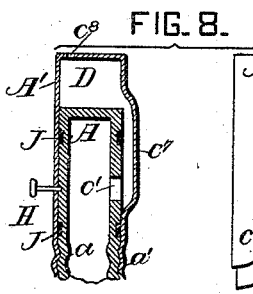
Figure 9:
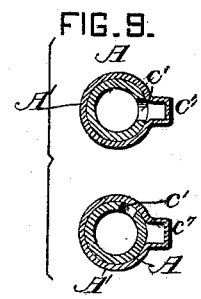

Figure 1 is a vertical central section of this device showing the cone valve nozzle or faucet provided with screw threads for lifting the central valve. Fig. 2 is a like view showing a modification of the construction. Fig. 3 is a like view showing the screw thread-bolt means of connection at the lower end of the vessel or package and outside the bottom conical portion of the spouted valve or nozzle. Fig. 4 is a like view showing a modification of the construction of the screw threaded cone valve or nozzle. Fig. 5, is a vertical central section showing the cone valve having a modified form of screw connection. Fig. 6 is a like view showing the screw threaded cone valve applied to a tube or spout or pipe. Figs. 7, 8 and 9 are vertical and horizontal sectional views of the other applications of said cone valve.

This invention is an improvement in the class of faucets or nozzles, and the novelty consists in the construction of the valve or faucet and its adaptation for insertion or removal from the vessel or package with which it is used, as it will now be more fully set forth and explained as well as pointed out in the claims.

The distinguishing feature of my faucet is that it is cone shaped and screw threaded, though in some adaptations the cone shape may be omitted; and its value consists in the cheapness of its cost, the ease of its application to any vessel or package, and the security of it as a means of closing the aperture or vent of said vessel or package.

No washer or packing is needed in applying my device or in its use. As my device is made of sheet metal the expense of drilling, grinding, or fitting necessary in cast metal faucets, is obviated.

In the accompanying drawings, A is the inside cone, screw threaded at $a$, and which may fit at its sides as in Figs. 1 and 7, or as in Figs. 2, 3, 4, 5 and 8, into the outside cone A', correspondingly screw threaded at $a'$. Both these parts being made of sheet metal and of proper relative size there is an exact fit, the outer more or less entirely embracing the inner and forming a spring valve seat. The inside cone A has a closed bottom. Or, when the position of the parts is reversed, as in Figs. 6 and 8, the top of the inside cone will be closed.

In the construction shown in Fig. 2 the two cones are provided with registering holes or apertures $c^3$, through which the liquid flows as the vessel is tilted, into the inner cone A, which is closed at its top and provided with an opening $c'$, through which the liquid passes into an annular chamber B, formed as shown in Fig. 1, by a contraction of the walls of the inner cone or chamber A. D is a spout leading from chamber B, and $c^4$, $c^5$, $c^6$, are air vents for the free admission of air to the receptacle to replace the liquid withdrawn. As shown, these vents, together with the registering apertures, will be closed by the rotation of the inner cone.

Fig. 3 shows my cone valve with the inside cone A adapted to turn inside of and connected to outside cone A', at the bottom by means of screw bolt L. The top of inside shell A is formed pitcher shaped having spout or nozzle D for pouring purposes, said cones having registering passages $c^3$, and vents $c^6$, for outlet of fluid from vessel E, and venting purposes respectively whereby the faucet may rest securely within a vessel while the top of the inside cone may be formed so as to occupy very little space above the surface of the reservoir. Said cone A, is not subject to inside pressure as constructed, and is therefore suited for steam pressure. Or it may be preferred to put the screw thread at or below the surface of the vessel, as at $a^x$ and $a'^x$, Fig. 4, which letters respectively designate an extension of the inside and outside parts A and A'.

Fig. 5 shows my cone valve having corresponding operating screws for opening and closing the valve and vent located at and below the surface of a vessel or within a tube. Also outside cone A', has an additional screw $A^3$, formed therein for attachment to other device, while the top of inside cone A is extended with a pouring or spouted opening at or near the top and opposite openings for venting and pouring. Dotted lines indicate an opening which might be made, instead of side opening $c'$, if desired.

In Fig. 5, $A^4$, indicates a screw of exact counterpart of inside cone screw to enable the reversing of said top for shipment or other purposes. $A^5$ is an ordinary reversible screw seating which divides screw within and screw $A^4$, above the vessel.

In Fig. 6 the reverse of the structure shown in Fig. 3 is illustrated, the conical shape of the inside and outside portions being dispensed with and a spouted handle substituted, substantially as used in Fig. 2.

In Fig. 8 is illustrated the use of the packing J, in suitable horizontal seats between the two parts of the valve, and in this instance the escape chamber and spout or nozzle are combined in the nozzle D, into which the fluid from the pipe tank or vessel finds access through the aperture $c'$.

The different forms to which my invention is capable of application are very numerous, and some of them are illustrated in drawings Figs. 8 and 9 to indicate the facility with which the application can be made. In each of the illustrations are embraced the essential ideas of my present invention.

Having thus described my invention, what I claim is—

1. A valve consisting of two sheet metal shells having corresponding screw threads and having beyond said screw threads close fitting side walls, the registering apertures formed in said side walls, said outer shell having an expanded portion whereby a chamber is formed between said shells, said expanded portion being provided with an outlet, substantially as set forth.

2. A valve consisting of an outer and an inner shell having corresponding screw threads and having beyond said screw threads close fitted side walls, said walls being contracted and provided with registering apertures, the contracted portion of the inner shell extending above that of the outer shell, whereby an annular chamber is formed between the shells, the outer shell being provided with a spout and the inner shell having an aperture registering with the spout, substantially as set forth.

3. A valve consisting of two sheet metal shells having corresponding screw threads and having beyond said screw threads, close fitting side walls, the outside shell being provided with an outlet, substantially as set forth.

4. A valve consisting of two sheet metal shells having corresponding screw threads and having beyond said screw threads close fitting side walls, the registering apertures formed in said walls and a spouted outlet, substantially as set forth.

In testimony whereof I affix my signature in presence of two witnesses.

RIVERIUS MARSH.

Witnesses:
JOSEPH ROY,
L. L. JOHNSON.